US010158687B2

(12) United States Patent
Fisher et al.

(10) Patent No.: US 10,158,687 B2
(45) Date of Patent: Dec. 18, 2018

(54) CACHING USING MULTICAST RADIO TRANSMISSIONS

(71) Applicant: Hughes Networks Systems, LLC, Germantown, MD (US)

(72) Inventors: Patrick Boyle Fisher, Rockville, MD (US); Matthew Mario Butehorn, Mount Airy, MD (US); Thomas Paul Gaske, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 59 days.

(21) Appl. No.: 15/057,752

(22) Filed: Mar. 1, 2016

(65) Prior Publication Data
US 2017/0257407 A1 Sep. 7, 2017

(51) Int. Cl.
| H04L 29/06 | (2006.01) |
| H04L 12/18 | (2006.01) |
| H04L 29/08 | (2006.01) |
| H04W 4/06 | (2009.01) |
| H04W 72/12 | (2009.01) |

(52) U.S. Cl.
CPC .......... *H04L 65/4076* (2013.01); *H04L 12/18* (2013.01); *H04L 67/2842* (2013.01); *H04W 4/06* (2013.01); *H04W 72/12* (2013.01)

(58) Field of Classification Search
CPC .................. H04L 65/4076; H04L 67/2842
See application file for complete search history.

(56) References Cited

U.S. PATENT DOCUMENTS

| 6,658,463 | B1 | 12/2003 | Dillon |
| 6,965,581 | B2 | 11/2005 | Nguyen |
| 9,219,790 | B1* | 12/2015 | Filev ....................... H04L 67/22 |
| 2007/0009235 | A1* | 1/2007 | Walters ............. H04N 21/6581 |
| | | | 386/278 |
| 2009/0168752 | A1 | 7/2009 | Segel |
| 2010/0235528 | A1* | 9/2010 | Bocharov .......... H04N 21/6437 |
| | | | 709/231 |
| 2013/0081072 | A1 | 3/2013 | Alward |
| 2013/0159455 | A1* | 6/2013 | Braskich ............... H04L 67/303 |
| | | | 709/217 |

(Continued)

OTHER PUBLICATIONS

Chen, H., Abrams, M., Johnson, T., Mathur, A., Anwar, I., & Stevenson, J. (Mar. 1999). Wormhole caching with HTTP PUSH method for a satellite-based web content multicast and replication system. In Proceedings of the 4th International Web Caching Workshop, San Diego, CA.

(Continued)

*Primary Examiner* — Alex Skripnikov
*Assistant Examiner* — Sharmin Chowdhury
(74) *Attorney, Agent, or Firm* — NovoTechIP International PLLC

(57) ABSTRACT

A method of providing data via radio transmissions, the method including identifying a first content item as being of potential interest to multiple remote radio terminals; and in response to the identification of the first content item, cause a first portion of the first content item to be transmitted to a first plurality of remote radio terminals via a first multicast radio transmission, wherein the first transmission identifies the first portion of the first content as data which may be cached by the first plurality of remote radio terminals.

20 Claims, 6 Drawing Sheets

(56) References Cited

U.S. PATENT DOCUMENTS

| | | | |
|---|---|---|---|
| 2013/0246578 A1 | 9/2013 | Moreman | |
| 2013/0336190 A1 | 12/2013 | Dankberg | |
| 2014/0230003 A1* | 8/2014 | Ma | H04N 21/231 |
| | | | 725/115 |
| 2015/0288733 A1* | 10/2015 | Mao | H04L 65/4076 |
| | | | 709/219 |
| 2015/0358692 A1* | 12/2015 | Markovitz | H04N 21/8456 |
| | | | 725/93 |

OTHER PUBLICATIONS

International Search Report and Written Opinion dated May 26, 2017 by the International Searching Authority (European Patent Office) in PCT Application PCT/US2017/020152.

* cited by examiner

CACHING USING MULTICAST RADIO TRANSMISSIONS

BACKGROUND

Investment in, and subscriptions to, radio-based communication networks, such as satellite data communications or cellular data communications, depends significantly on reserve communication capacity and efficient use of limited capacity. As a result, system improvements that improve both of these characteristics are valuable, particularly when they can be applied with no changes or minor changes to preexisting communications hardware infrastructure, such as space-bound satellites and cellular base stations.

SUMMARY

In a general aspect, a method of providing data via radio transmissions, the method including identifying a first content item as being of potential interest to multiple remote radio terminals; and in response to the identification of the first content item, cause a first portion of the first content item to be transmitted to a first plurality of remote radio terminals via a first multicast radio transmission, wherein the first transmission identifies the first portion of the first content as data which may be cached by the first plurality of remote radio terminals.

Particular implementations may include one or more of the following features. The method may include receiving a first request for the first content item from a first radio terminal; and receiving a second request for the first content from a second radio terminal; wherein the first content item is identified based on the first request and the second request.

The identifying the first content item and the causing the first portion of the first content item to be transmitted may be performed prior to any of the first plurality of remote radio terminals receiving a request for the first content item. The first content item may include a software update or multimedia item.

The first transmission may be transmitted by a communication satellite and each of the first plurality of remote radio terminals may include a satellite communication receiver adapted to receive the first transmission from the communication satellite.

The first transmission may be transmitted by a cellular communications base station and each of the first plurality of remote radio terminals may include a transceiver adapted to receive the first transmission from the base station.

The first transmission may also be transmitted to a second plurality of remote radio terminals not included in the first plurality of remote radio terminals; and the first transmission may include information which causes the second plurality of remote radio terminals to not cache the first portion of the first content item received via the first transmission.

The method may further include receiving cache usage information from a plurality remote radio terminals; wherein the first content item is identified based on the cache usage information.

The method may further include receiving, at a first remote radio terminal included in the first plurality of remote terminals, the first transmission; in response to the receiving of the first transmission, storing the first portion of the first content item in a cache included in the first remote radio terminal; receiving, at the first remote radio terminal, a request for the first content; and providing the first portion of the first content item from the cache in response to the request.

The method may further include identifying, at the first remote radio terminal, one or more missing portions of the first content item not successfully received via multicast transmissions; receiving, from the first remote radio terminal, information identifying the missing portions; and causing the missing portions to be transmitted to the first remote radio terminal via one or more multicast radio transmissions.

In a general aspect, a data communication system including a cache server including one or more processors configured to: identify a first content item as being of potential interest to multiple remote radio terminals, and in response to the identification of the first content item, cause a first portion of the first content item to be transmitted to a first plurality of remote radio terminals via a first multicast radio transmission, wherein the first transmission identified the first portion of the first content as data which may be cached by the first plurality of remote radio terminals.

Particular implementations may include one or more of the following features. The one or more processors may further be configured to: receive a first request for the first content item from a first radio terminal; and receive a second request for the first content from a second radio terminal; wherein the first content item is identified based on the first request and the second request.

The identifying the first content item and the causing the first portion of the first content item to be transmitted may be performed prior to any of the first plurality of remote radio terminals receiving a request for the first content item.

The first transmission may be transmitted by a communication satellite and each of the first plurality of remote radio terminals may include a satellite communication receiver adapted to receive the first transmission from the communication satellite.

The first transmission may be transmitted by a cellular communications base station and each of the first plurality of remote radio terminals may include a transceiver adapted to receive the first transmission from the base station.

The first transmission may also be transmitted to a second plurality of remote radio terminals not included in the first plurality of remote radio terminals; and the first transmission may include information which causes the second plurality of remote radio terminals to not cache the first portion of the first content item received via the first transmission.

The data communication system may further include a remote radio terminal including a radio receiver adapted to receive the first transmission, a cache storage unit, and one or more processors adapted to: in response to receiving the first transmission, store the first portion of the first content item in the cache storage unit, receive a request for the first content, and provide the first portion of the first content from the cache storage unit in response to the request.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
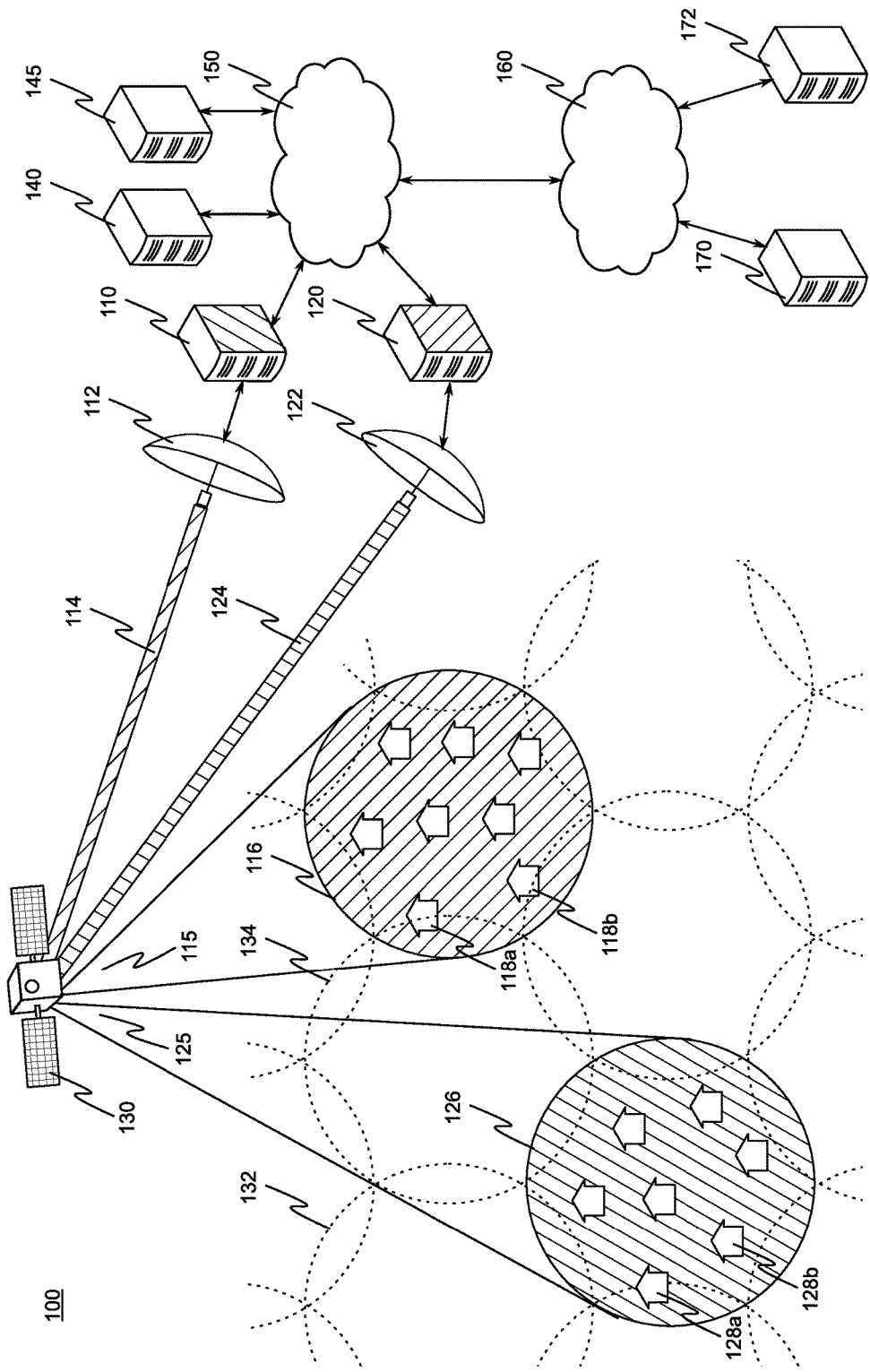
FIG. 1 illustrates an example of a system for caching using multicast radio transmissions.

FIG. 1 illustrates an example of a system 100 for caching using multicast radio transmissions. In the particular example illustrated in FIG. 1, remote sites, such as remote sites 118a, 118b, 128a, and 128b, obtain content items from sources such as content servers 170 and 172 via forward radio downlinks transmitted by communication satellite 130. In the particular example illustrated in FIG. 1, satellite 130 is a space-borne High Throughput Satellite (HTS) configured to transmit data, such as the aforementioned content items, to remote sites via a plurality of narrowly focused regional spot beams, such as spot beams 115 and 125. Independent data streams may be transmitted on each of the spot beams. Each spot beam defines a communication cell, with neighboring cells typically operating at different frequencies and/or polarizations, typically according to a three- or four-color coloring scheme to allow reuse of frequencies and/or polarizations. FIG. 1 illustrates a number of cells, including cells 116, 126, 132, and 134. Remote sites located within these cells, such as remote sites 118a and 118b, may be adapted or configured to receive data transmissions from satellite 130 via equipment such as a Very Small Aperture Terminal (VSAT). In some embodiments, more than one satellite may be used. In some embodiments, other types of satellites may be used, including, but not limited to, Fixed Satellite Service (FSS) and High Capacity Satellites (Hi-CapS). In some embodiments, an aircraft such as, but not limited to, a balloon, airship, or unmanned aircraft vehicle (UAV) including the necessary communication equipment may serve as satellite 130. In some embodiments, optical communication, rather than radio communication may be used between satellite 130 and remote sites and/or gateways.

Satellite 130 is configured to receive data from one or more gateway stations for retransmission via spot beams to remote sites located within cells defined by the spot beams. In the example illustrated in FIG. 1, gateway 110 is configured to provide a feeder data stream 114 to satellite 130 via transmission antenna 112, and satellite 130 is configured to retransmit data included in feeder data stream 114 via spot beam 115 for cell 116 (as illustrated by the consistent hatching for gateway 110, feeder data stream 114, and cell 116). Located within cell 116 are a plurality of remote sites, including remote sites 118a and 118b. Also, gateway 120 is configured to provide a feeder data stream 124 to satellite 130 via transmission antenna 122, and satellite 130 is configured to retransmit data included in feeder data stream 124 via spot beam 125 for cell 126 (as illustrated by the consistent hatching for gateway 120, feeder data stream 124, and cell 126). Located within cell 126 are a plurality of remote sites, including remote sites 128a and 128b. The remote sites, such as remote sites 116a, 116b, 118a, and 118b, may include fixed receivers (including, for example, an antenna installed on a roof of a residence or business) and/or mobile receivers (including, for example, land-based vehicles, marine vehicles, aircraft, and handheld devices). A remote site may move between, or be assigned to different cells over time. It is noted that a feeder data stream, such as feeder data stream 114, may multiplex data for a plurality of spot beams. For example, gateway 110 may be configured to multiplex data for cells 116, 132, and 134 in feeder data stream 114, which is then demultiplexed by satellite 130 for separate transmission to cells 116, 132, and 134 via their respective spot beams.

Gateway 110 is configured to provide content items to the remote sites included in its associated cells (for example, cell 116) in response to content requests received from the remote sites. Such content requests may be received via radio communications, such as a content request transmitted via a reverse radio uplink between a remote site and satellite 130 which satellite 130 forwards to gateway 110, or they may be received via terrestrial communications, such as via a telephone modem or DSL (digital subscriber line) network connection. Examples of content items include, but are not limited to, a data object returned by a server, such as content servers 170 and 172, in response to a received identification of the data object, such as a URL (universal resource locator) included an HTTP request. Many network-based protocols used for obtaining content items involve exchanging multiple messages in order to perform tasks such as establishing a communication session, authenticating a user with a server, and identifying a content item. To avoid latency associated with relaying multiple messages via satellite 130, a remote site may include a proxy server that interacts with an application program executing at the remote site to identify a content item being sought by the application without performing some or all of the message exchanges via satellite 130. Alternatively, or in addition, a proxy server may be implemented on the gateway side or protocol-aware packet inspection may be performed in order for gateway 110 to determine a content item being sought by a remote site. Also, an application program may be specifically configured to request content items in a manner that facilitates a proxy server and/or gateway 110 identifying which content items are being sought by the application. For example, an application program may utilize encrypted communication for obtaining a content item, and the proxy server or gateway 110 may be provided with information effective to identify the content item based on an encrypted request. Gateway 120 is configured in much the same manner as gateway 110.

Gateways 110 and 120 are each configured to transmit and receive data via network 150. Via network 150, gateways 110 and 120 can interact with cache server 140, preload cache server 145, and wide area network 160 (one example of which is the Internet), among other things. Via wide area network 160, gateways 110 and 120, cache server 140, and preload cache server 145 can interact with content servers 170 and 172 to obtain content items, as well as interact with other systems accessible via the wide area network 160. The term "cache server" is not intended to imply that cache server 140 or preload cache server 145 cache content items for later retrieval, although it they include such functionality; instead, the term indicates that cache server 140 and preload cache server 145 are configured to identify content items (or portions thereof) which are of potential interest to multiple remote radio terminals and as a result may be delivered to remote sites via multicast radio transmissions, and consequently locally cached by remote sites that receive such multicast radio transmissions. Although the example illustrated in FIG. 1 illustrates a single cache server 140 and a single preload cache server 145 used by both gateway 110 and 120, in some implementations each gateway 110 and 120 may have its own respective cache server 140 and/or preload cache server 145. However, in an implementation where a shared cache server 140 is used, as illustrated in FIG. 1, it may be simpler to implement a cache server 140 that bases multicasting recommendations for a content item based on content requests received across a larger sample of remote sites included in a service network. In some implementations there may be respective cache servers and preload cache servers for each spot beam. Accordingly, such implementations may have a plurality of cache servers and preload cache servers associated with a single gateway, where the gateway is used to service multiple spot beams.

Much as noted above, feeder data stream 114 produced by gateway 110 supplies satellite 130 with data for retransmission via the spot beams associated with gateway 110, such as spot beam 115 for cell 116. Such data may include, for example, unicast data directed to individual remote sites, such as remote sites 118a and 118b in cell 116. There may be periods of time during which the unicast data available for a spot beam does not utilize all of the available capacity for the spot beam. In response to identifying such a period, gateway 110 may obtain one or more content items identified by cache server 140 and/or preload cache server 145 for the spot beam to be transmitted via the spot beam as a multicast radio transmission for use by some or all of the remote sites being serviced by the spot beam. In some circumstances, gateway 110 may delay or slow down the transmission of some portions of available unicast data in order to allow multicast data, or an increased amount of multicast data, to be transmitted. This can result in a substantial increase in efficient use of spot beam capacity where a significant number of remote sites within the cell serviced by the spot beam seek the same content item, as the alternative would involve the content item being provided to some or all of those remote sites via separate unicast responses.

There may be periods of time that the amount of data required to transmit all of the content items identified by cache server 140 and/or preload cache server 145 exceeds a short-term estimate of a total amount of multicast transmission capacity. During such periods, gateway 110 may be configured to prioritize the identified content items. In some implementations, cache server 140 may perform its own prioritization of the content items it has identified, and preload cache server 145 may perform its own prioritization of the content items it has identified. Where a group of remote sites is associated with an identified content item, the number of remote sites included in the group may be used for such prioritization. Additionally, a time at which remote sites are expected to begin seeking a content item may be used for prioritization. In some circumstances, a content item identified by preload cache server 145 may be given priority over a content item identified by cache server 140, as the content item identified by the preload cache server 145 may be associated with an event that is considered more likely to result in a significant number of content requests. Prioritization may be based on the sizes of content items, whether to prefer more smaller content items over fewer larger content items, to prefer fewer larger content items over more smaller content items, or to identify content items having a size that corresponds to the estimated amount of multicast transmission capacity. Prioritization may be based on how recently a content item was identified by cache server 140 or preload cache server 145. For example, more recently identified items may receive higher priority.

There may be periods during which the combined spot beam forward downlink capacity for the cells associated with gateway 110 exceeds the capacity available on feeder data stream 114. Satellite 130, gateway 110, and/or cache server 140 may be configured to identify or anticipate such periods, and indicate and/or determine that a multicast transmission should be transmitted on not just one, but a plurality of spot beams. Accordingly, although gateway 110 or cache server 140 may determine initially to perform a multicast radio transmission to a single cell, gateway 110 or cache server 140 may increase the number of cells the content item (or portion thereof) to more fully utilize available spot beam bandwidth.

Figure 2:
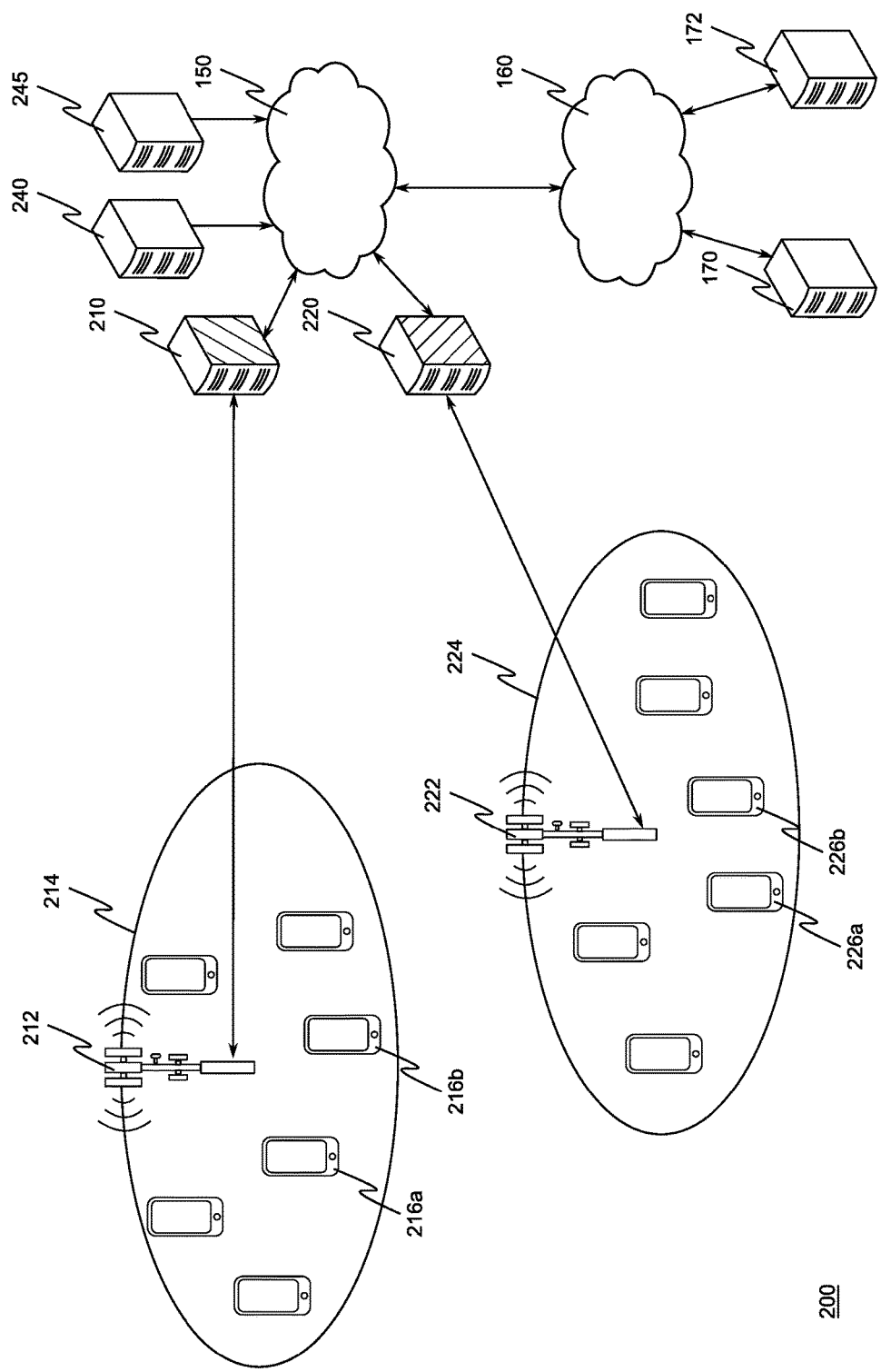
FIG. 2 illustrates an example of a system for caching using multicast radio transmissions.

FIG. 2 illustrates an example of a system 200 for caching using multicast radio transmissions. In the particular example illustrated in FIG. 2, remote sites, such as remote sites 216a, 216b, 226a, and 226b, obtain content items from sources such as content servers 170 and 172 via radio transmissions from cellular base stations, such as base stations 212 and 222. In the particular example illustrated in FIG. 2, base station 212 defines a first cell 214, in which six remote sites, including remote sites 216a and 216b, are currently configured to receive content items from base station 212. Base station 222 defines a first cell 224, in which six remote sites, including remote sites 226a and 226b, are currently configured to receive content items from base station 222. The remote sites, such as remote sites 216a, 216b, 218a, and 218b, may include fixed receivers (including, for example, an antenna installed on a roof of a residence or business) and/or mobile receivers (including, for example, land-based vehicles, marine vehicles, aircraft, and handheld devices). A remote site may move between, or be assigned to different cells over time.

Base station controller 210 (which may also be referred to as a "gateway") is configured to provide content items to the remote sites included in its associated cell 214 in response to content requests received by the remote sites. Typically, such content requests are received via radio communications from the remote sites to base station 212. Proxy servers may be utilized by the remote sites and base station controllers of FIG. 2 in much the same manner discussed with respect to FIG. 1. Base station controller 220 is configured in much the same manner as gateway 210.

Base station controllers 210 and 220 are each configured to transmit and receive data via network 150. Via network 150, base station controllers 210 and 220 can interact with cache server 240, preload cache server 245, and wide area network 160 (one example of which is the Internet), among other things. Via wide area network 160, base station controllers 210 and 220, cache server 240, and preload cache server 245 can interact with content servers 170 and 172 to obtain content items, and interact with other systems accessible via the wide area network 160. Although the example illustrated in FIG. 2 illustrates a single cache server 240 and a single preload cache server 245 used by both base station controllers 210 and 220, in some implementations each base station controller 210 and 220 may have its own respective cache server 240 and/or preload cache server 245. However, in an implementation where a shared cache server is used, as illustrated in FIG. 2, it may be simpler to implement a cache server 240 that bases multicasting recommendations for a content item based on content requests received across a larger sample of remote sites included in a service network.

Base station controller 210 provides data to remote sites that are configured to receive data via base station 212. Such data may include, for example, unicast data directed to individual remote sites, such as remote sites 216*a* and 216*b* in cell 214. There may be periods of time during which the unicast data available for cell 214 does not utilize all of the capacity cell 214. In response to identifying such a period, base station controller 210 may obtain one or more content items identified by cache server 240 and/or preload cache server 245 for cell 214 to be transmitted by base station 212 as a multicast radio transmission for use by some or all of the remote sites configured for cell 214. In some circumstances, base station controller 210 may delay or slow down the transmission of some portions of available unicast data in order to allow multicast data, or an increased amount of multicast data, to be transmitted. This can result in a substantial increase in efficient use of cell capacity where a significant number of remote sites within the cell seek the same content item, as the alternative would involve the content item being provided to some or all of those remote sites via separate unicast responses. Much as discussed with respect to FIG. 1, there may be periods of time that the amount of data required to transmit all of the content items identified by cache server 240 and/or preload cache server 245 exceeds a short-term estimate of a total amount of multicast transmission capacity. The prioritization techniques discussed with respect to FIG. 1 may also be utilized by base station controller 210, cache server 240 and/or preload cache server 245.

Figure 3:
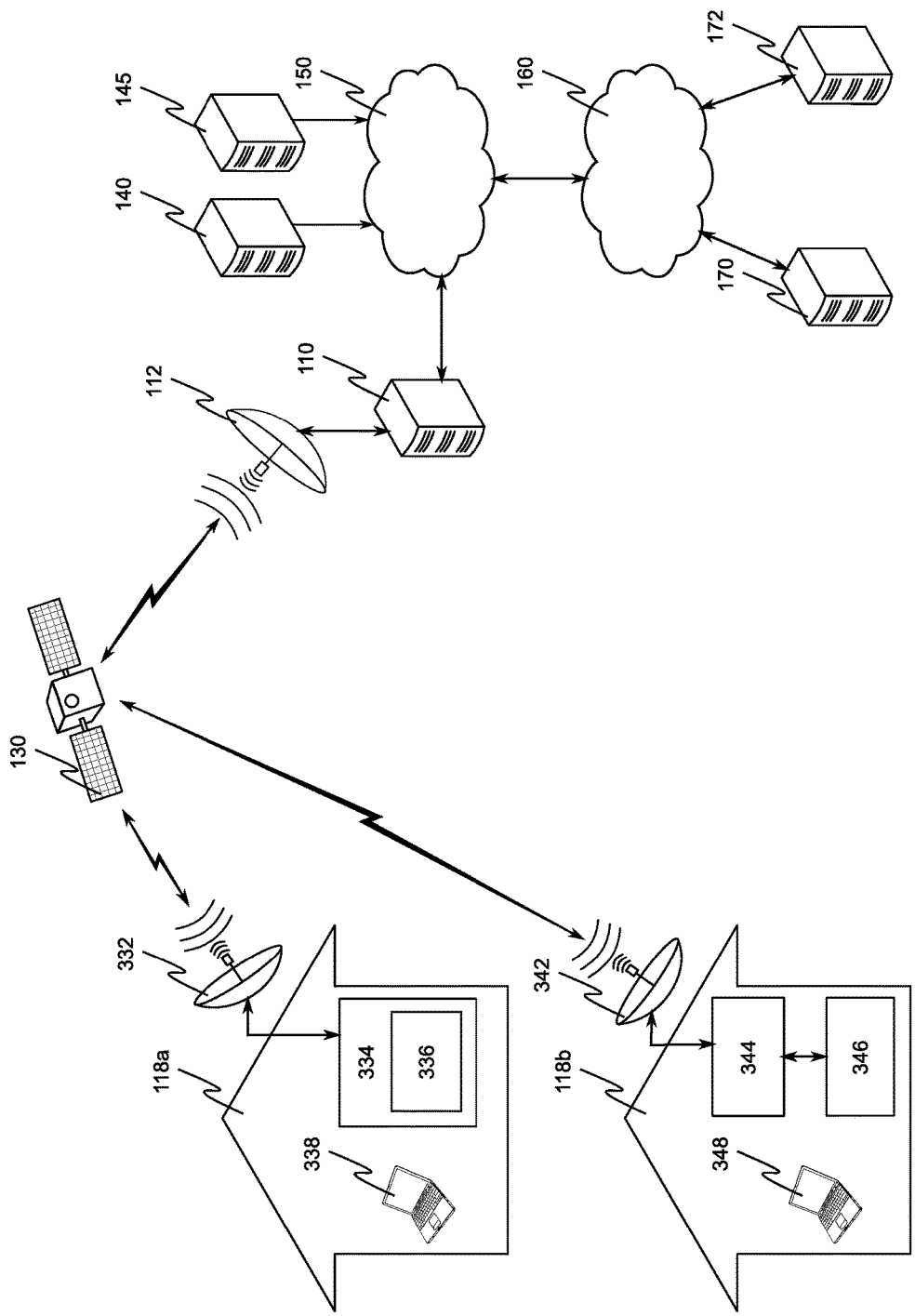
FIG. 3 illustrates a portion of the system illustrated in FIG. 1.

FIG. 3 illustrates a portion of the system 100 illustrated in FIG. 1. In FIG. 3, remote sites 118*a* and 118*b* of cell 116 are illustrated. Remote site 118*a* includes remote radio terminal 334, which decodes radio signals transmitted by satellite 130 and received via VSAT 332. Also at remote site is computer 338, which exchanges data with remote radio terminal 334 via a wired or wireless network connection. Accordingly, computer 338 is able to exchange information with gateway 110 and other systems communicatively coupled thereto via reverse upstream transmissions to satellite 130 and forward downstream transmissions from satellite 130 via remote radio terminal 334. Such information exchanges are typically performed under control of an application program executing on computer 338. Other devices (not illustrated), besides computer 338, may also perform data communications via remote radio terminal 334, such as, but not limited to, set top boxes, televisions, appliances, handheld computing devices, and home security systems. Remote radio terminal 334 includes a content cache storage unit 336, which is utilized to temporarily store a copy of content items received via multicast radio transmissions. Remote radio terminal 334 may be configured to select only some of the content items received via multicast radio transmissions for storage in content cache storage unit 336. For example, remote radio terminal 334 may be configured to maintain a history of previously received content items, and not store content items that were previously received. As another example, remote radio terminal 334 may be configured to use history to determine that a type of content item or a source of a content item is unlikely to be used by remote radio terminal 334 (for example, if remote radio terminal 334 has never been used to access streaming media service XYZ, content items associated with streaming media service XYZ are unlikely to be of interest). Content cache storage unit 336 may be integrated with a general caching mechanism used by remote radio terminal 334 for all received content items.

Remote site 118*b* is much like remote site 118*a*. However, at remote site 118*b*, content cache storage unit 346 is a separate unit from remote radio terminal 334. Content cache storage unit 346 includes a data interface that allows it to store and retrieve content items for remote radio terminal 334, such as, but not limited to, a wired or wireless network interface, or a data interface such as USB (Universal Serial Bus), Thunderbolt, FireWire, or eSATA. Remote sites 118*a* and 118*b* may each be configured to ensure that content items, or portions thereof, stored in content cache storage units 336 and 346 is encrypted at rest.

Figure 4:
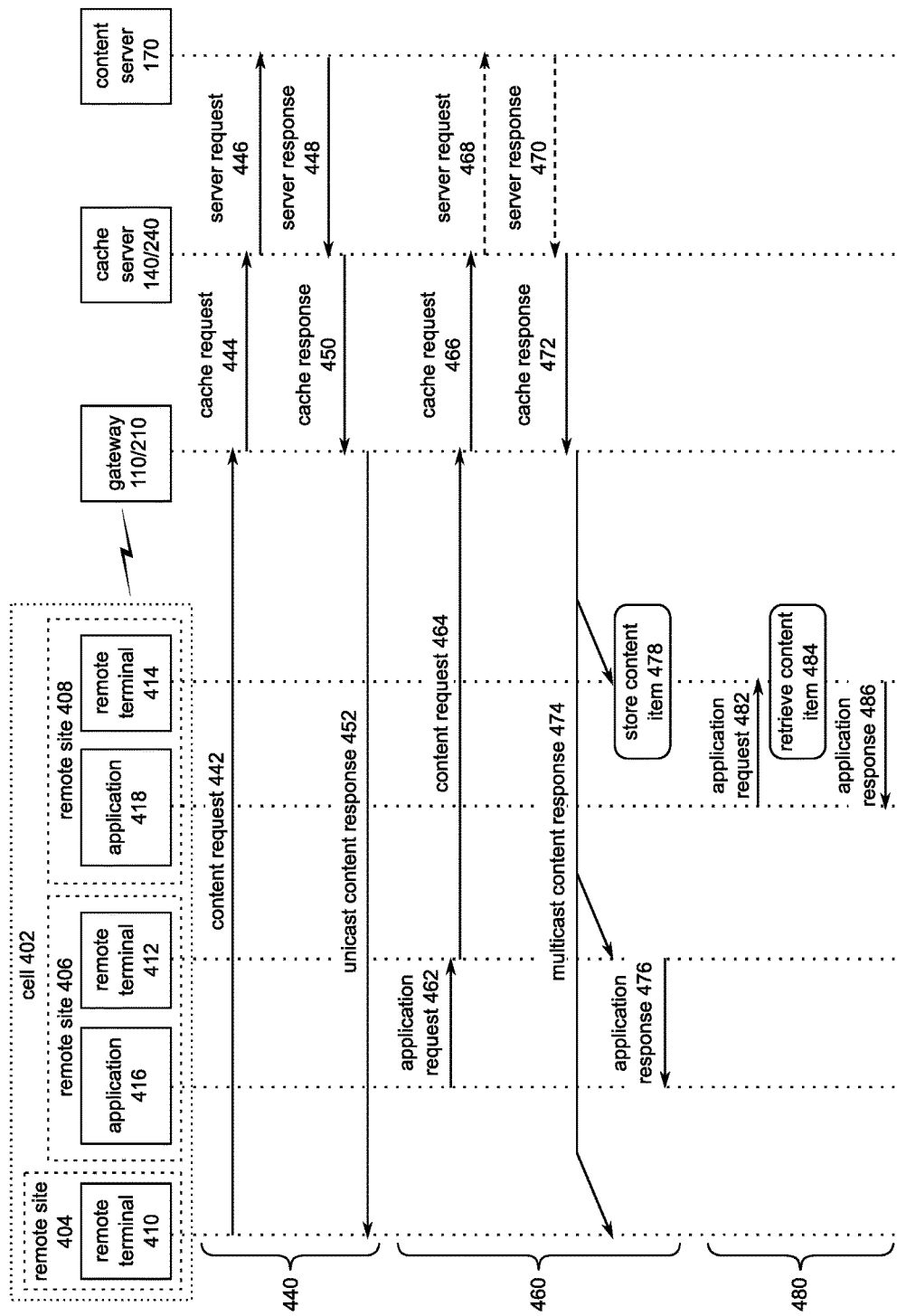
FIG. 4 illustrates an example of a gateway interacting with remote sites located within a cell in connection with requests for a single content item.

FIG. 4 illustrates an example of a gateway 420 interacting with remote sites 404, 406, and 408 located within a cell 402 in connection with requests for a single content item. 440 illustrates various events that occur in response to a first content request issued by a first remote site 404. At 442, the first remote terminal 410 transmits a content request to gateway 110/210. The content request may be generated in response to an application request (much as discussed below with respect to applications 416 and 418), which may initiate on remote terminal 410 or be initiated by an application program executing on another computing device at or near remote site 404 at which remote terminal 410 is located, such as computers 338 and 348 illustrated in FIG. 3. As noted previously, the content request may be transmitted via radio communication or via terrestrial communication such as, but not limited to, a telephone modem or DSL. At 444, gateway 110/210 issues a cache request to cache server 140/240. In some implementations, gateway 110/210 may be configured to fulfill content requests via multiple cache servers, with some cache servers being associated with particular types of content items or particular sources of content items. For example, there may be a content server specifically configured to handle content requests associated with the streaming media service XYZ mentioned previously, which is configured to determine which content items are being requested and obtain them from streaming media service XYZ.

Cache server 140/240 is configured to determine whether a content item may be of potential interest for multiple remote terminals. This determination may include identifying a particular group or groups of remote terminals in association with the content item. For example, a group of remote terminals may consistently make use of a particular type or source of content items. In the example illustrated in FIG. 4, the cache request at 444 is the first request received for the indicated content item. In some situations, the single cache request at 444, based on past interactions with related content items, such as, but not limited to, content items that come from a single content server or are often requested by a group of remote terminals, may result in cache server 140/240 determining that the content item indicated in the cache request at 444 is of potential interest, despite cache server 140/240 having received no previous requests for the content item. In some implementations, remote stations may be configured to provide cache usage information to gateway 110/210 and/or cache server 140/240, and the cache usage information may be used to identify content items of potential interest. In the example illustrated in FIG. 4, cache server 140/240 does not determine that the content item is of potential interest in response to the cache request at 444. Cache server 1140/240 identifies content server 170 as the appropriate source from which it should obtain the content item, and at 446 issues a server request to content server 170 to obtain the content item.

At 448, content server 170 transmits a server response to cache server 140/240 which includes the requested content item or a portion thereof. Based on the received server response, cache server 140/240 may determine that the content item is of potential interest for multiple terminals. In the example illustrated in FIG. 4, cache server 140/240 does not determine that the content item is of potential interest at this point. At 450, cache server 140/240 transmits a cache response to gateway 420, providing the content item to gateway 110/210 for transmission, at 452, to remote site 404 as a unicast content response. The unicast content response may be provided in the form of one or more unicast radio transmissions, depending on the size of the content item being provided to remote site 404.

In some implementations, cache server 140/240 may be configured to perform specialized handling of certain content items for streaming media. A common approach for providing streaming media is to encode an original source media into a plurality of streams, each at a different bitrate and/or resolution. Each of the streams is then divided into "slices" of equal duration; for example, a 30 minute video might be divided into 180 slices that are each 10 seconds in duration. Each of the slices from each of the streams may be independently requested from content server 170. A client application seeking to reproduce the associated streaming media item is configured to switch between different bitrates and resolution in response to available network bandwidth; for example, for media playback between 200-210 seconds a client may request slice #21 for a first stream with a bitrate of 3.2 Mbps, but for media playback between 210-220 seconds the client may request slice #22 for a second stream with a bitrate of 2.0 Mbps in response to insufficient bandwidth for the higher bitrate of the first stream. Many media streaming protocols, such as HTTP Live Streaming (HLS), Microsoft Smooth Streaming, and MPEG-DASH, make use of a manifest file (such as an MPEG-DASH MPD (Media Presentation Description) or an Extended M3U playlist used by HLS) that identifies each of the streams and provides information for requesting slices for each of the streams (such as, but not limited to, expressly providing a URI (uniform resource identifier) for each slice such as "segment-1.ts," "segment-2.ts," etc., or a URI template such as "segment-$Number$.ts"). Cache server 140/240 may be configured to identify when it has received an original manifest file from content server 170 (such identification may be performed based on, for example, a URI used to obtain the original manifest file or the contents of the original manifest file) in response to server request 446, identify a first plurality of streams specified in the original manifest file, and at 450 provide a modified manifest file to gateway 110/210 which specifies some, but not all, of the first plurality of streams. For example, the original manifest file may specify 10 streams with respective bitrates of 300 Kbps, 500 Kbps, 1 Mbps, 2 Mbps, 3 Mbps, 5 Mbps, 8 Mbps, 10 Mbps, 15 Mbps, and 20 Mbps, and the modified manifest file may specify only 4 of those streams, such as 300 Kbps, 1 Mbps, 10 Mbps, and 20 Mbps. Cache server 140/240 may be configured to determine which of the first plurality of streams to include in the modified manifest file based on the resolutions of the streams; for example, it may be configured to include at least one stream with a resolution appropriate for a smaller or lower resolution device such as a cellular phone or tablet, and at least one stream with a higher resolution appropriate for a larger or higher resolution device such as an computer display or HDTV. Cache server 140/240 may be configured to always include the stream with the highest bitrate, to ensure that the highest quality stream continues to be made available. Cache server 140/240 may be configured to select which streams are included in the modified manifest file based on bitrates and/or resolutions previously requested from content server 170. By reducing the number of streams in the modified manifest file, this improves the likelihood that when an application, such as application 416, requests a slice, the slice may be retrieved from a local cache. In some examples, generation of a modified manifest file may result in "preloading," as discussed below with respect to FIG. 5, of slices included in one or more of the streams specified in the modified manifest file.

460 illustrates various events that occur in response to a second content request issued by a second remote site 406. At 462, an application program, which may be executing on remote terminal 412 or another device at remote site 406, issues an application request seeking the same content item requested at 442. At 464, remote radio terminal 412 transmits a content request to gateway 110/210 in response to the application request at 462. At 466, cache server 140/240 determines that the requested content item is of potential interest for multiple remote terminals included in cell 402. This determination may be based on, for example, heuristic algorithms which detect repetitive requests for the same content, and upon triggering a configured or learned threshold, cache server 140/240 may determine that a content item is likely to be requested by multiple terminals in the broadcast network. Cache server 140/240 may also identify a group or subset of the remote sites that are likely to request the content item.

Depending on whether cache server 140/240 retained a copy of the content item provided in the server response at 448, cache server 140/240 may issue a second server request for the content item at 468 and receive a server response providing the content item at 470. In some circumstances, cache server 425 may determine that the requested content item is of potential interest for multiple remote terminals included in cell 402 at 472, after receiving the server response at 470.

At 472, cache server 140/240 provides a cache response to gateway 110/210 that indicates that the retrieved content item should be provided to the remote sites included in cell 402 in the form of a multicast content response. Additionally, if cache server 140/240 identified a group or subset of remote sites, the cache response may indicate this as well. At 474, gateway 110/210 sends a multicast content response to the remote sites included in cell 402. The multicast content response may be provided in the form of one or more multicast radio transmissions, depending on the size of the content item being sent.

FIG. 4 illustrates different actions performed by remote sites 404, 406, and 408 in response to receiving the multicast content response. Remote site 404 takes no action. This may be based on, for example, that remote terminal 410 previously requested and received the content item, and thus is unlikely to request the content item again. At 476, remote terminal 412 handles the multicast content response much like a unicast content response, and provides the received content item to the application in an application response. At 478, remote terminal 414 stores the content item or portion thereof provided in the multicast content response in its associated content cache storage unit for later potential use.

480 illustrates an example in which remote terminal 414 makes a later use of the content item received via the multicast content response at 474. At 482, an application program, which may be executing on remote terminal 414 or another device at remote site 408, issues an application request seeking the same content item requested at 442. At 484, remote terminal 414 identifies the content item that is being sought by the application, determines the content item is stored locally in its associated content cache storage unit, and retrieves the content item from the local storage. In this case, remote terminal 414 does not need to issue a content request to gateway 110/210, as was previously done by remote terminals 410 and 412. At 486, remote terminal 414 provides the received content item to the application in an application response.

Figure 5:
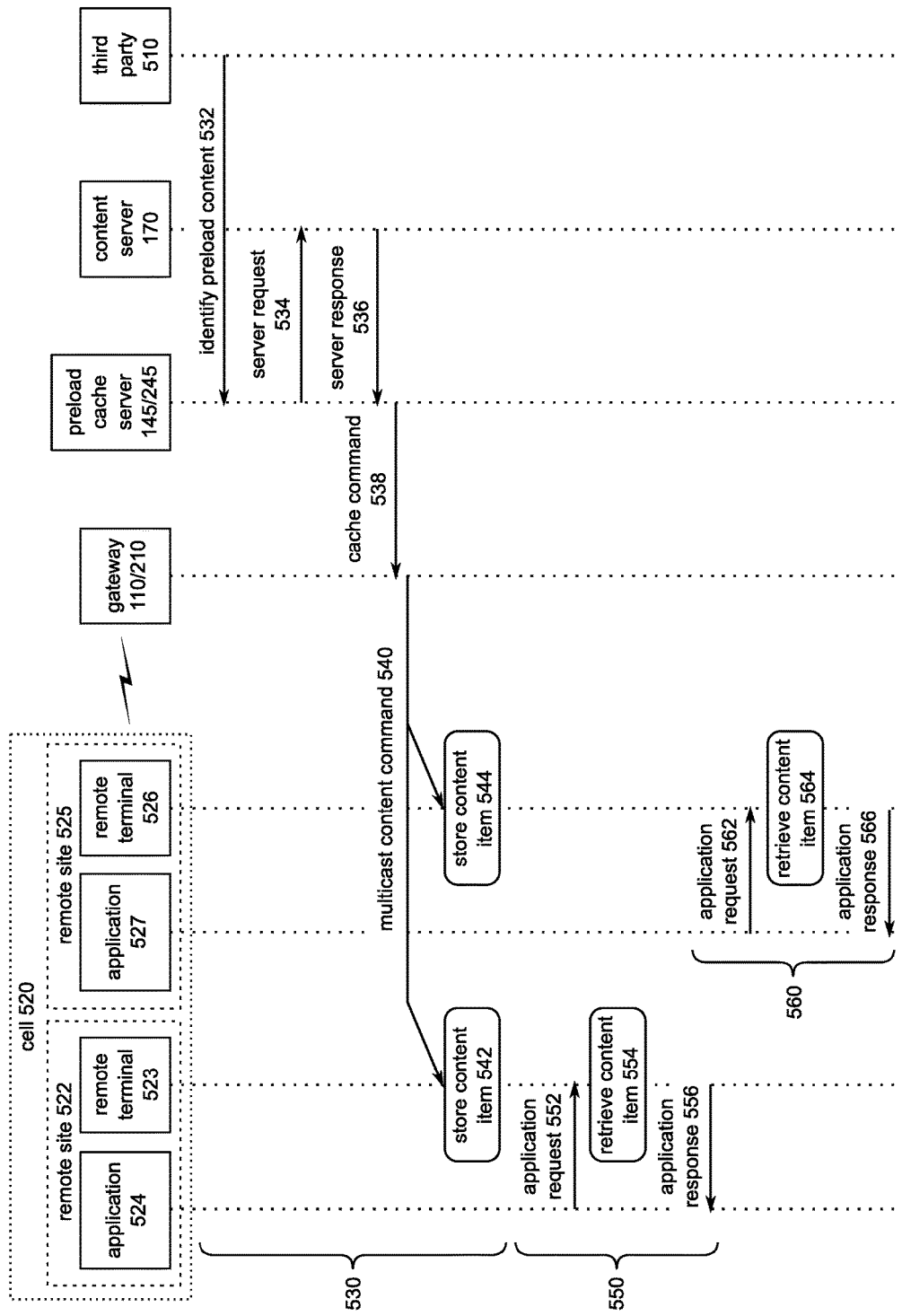
FIG. 5 illustrates use of a preload cache server to "preload" content cache units of remote sites with content items.

FIG. 5 illustrates use of a preload cache server 145/245 to "preload" content cache storage units of remote sites with content items. 530 illustrates a process by which "preloading" of a content item is performed. At 532, preload cache server 145/245 may receive an express identification from a third party 510 that a particular content item is of potential interest to multiple remote sites. Alternatively, preload cache server 145/245 may receive information regarding content requests received by gateway 110/210, and use this information to predictively identify content items that are of potential interest to multiple remote sites.

At 534, preload cache server 145/245 issues a server request to content server 170 to retrieve the identified content item, which is provided to preload cache server 145/245 in a server response issued by content server 170 at 536. At 538, preload cache server 145/245 issues a cache command to gateway 110/210, indicating that the content item should be provided to cell 520 via a multicast content command. Alternatively, gateway 110/210 may, in response to determining that spare downstream capacity is or will be available for cell 520, request from preload cache server 145/245 identification of one or more content items that it may transmit to cell 520 in a multicast content command. Preload cache server 145/245 may also provide an identification of a group or subset of remote sites that should respond to the multicast content command. At 540, gateway 110/210 sends a multicast content response to the remote sites included in cell 520. The multicast content response may be provided in the form of one or more multicast radio transmissions, depending on the size of the content item being sent. At 542, remote terminal 523 receives the content item or portion thereof and stores it in its associated content cache storage unit for possible later use. Likewise, at 544, remote terminal 525 receives the content item or portion thereof and stores it in its associated content cache storage unit for possible later use. 550 illustrates use of the cached content item by remote site 522, and 560 illustrates use of the cached content item by remote site 525. This proceeds much the same as 480 in FIG. 4.

Figure 6:
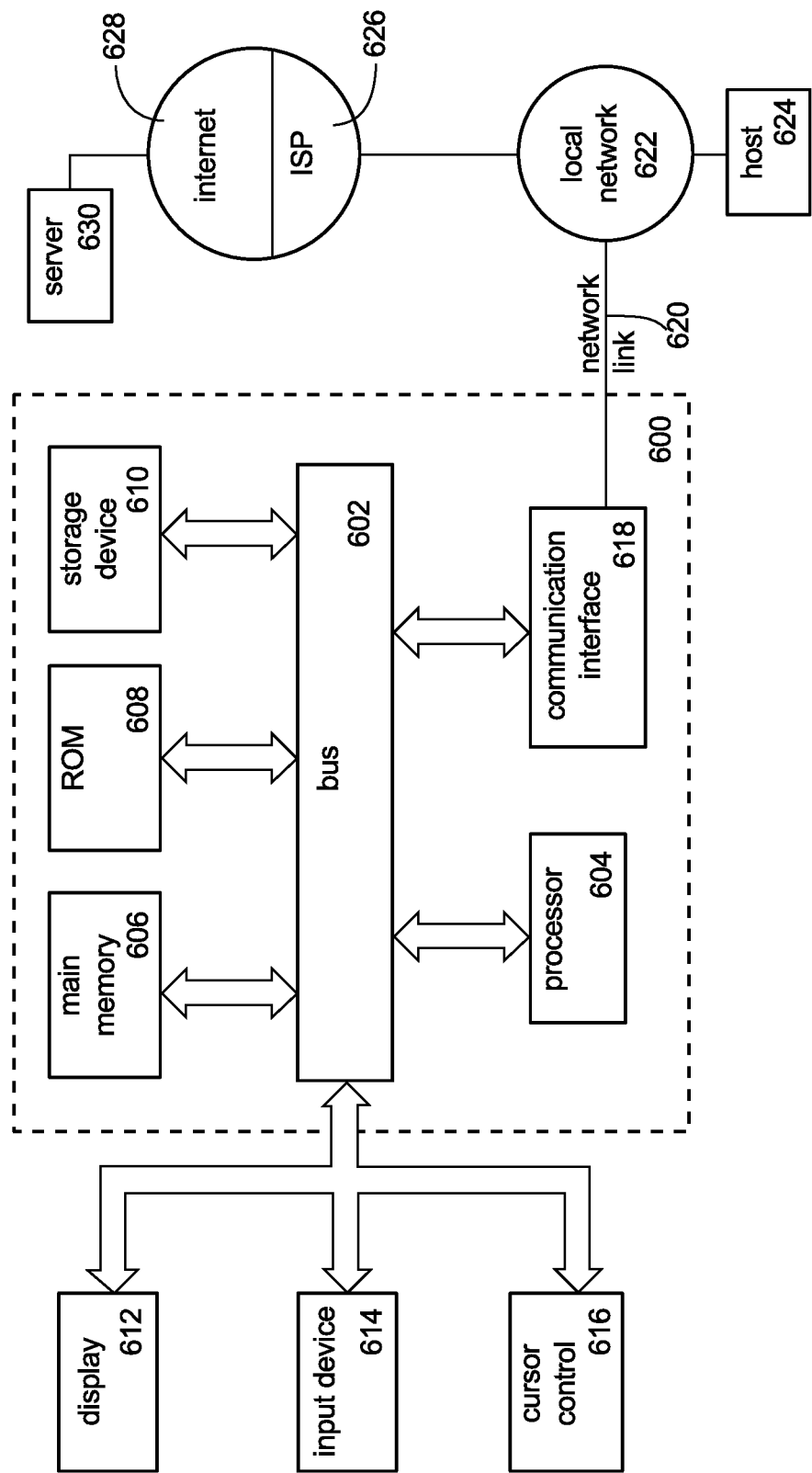
FIG. 6 is a block diagram that illustrates a computer system upon which aspects of this disclosure may be implemented.

FIG. 6 is a block diagram that illustrates a computer system 600 upon which aspects of this disclosure may be implemented, such as, but not limited to, gateways 110, 120, 210 and 220, cache servers 140 and 240, preload cache servers 145 and 245, content servers 170 and 172, satellite 130, remote sites 118a, 118b, 128a, 128b, 216a, 216b, 226a, 226b, 404, 406, 408, 522, and 525, base stations 212 and 222, remote terminals 334, 344, 410, 412, 414, 523, and 526, and computers 338 and 348. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Another type of user input device is a touchscreen, which generally combines display 612 with hardware that registers touches upon display 612.

This disclosure is related to the use of computer systems such as computer system 600 for implementing the techniques described herein. In some examples, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of providing data via radio transmissions, the method comprising:
   identifying a first content item as being of potential interest to multiple remote radio terminals;
   in response to the identification of the first content item, causing a first portion of the first content item to be transmitted to a first plurality of remote radio terminals and a second plurality of remote radio terminals via a first multicast radio transmission, wherein the first transmission identifies the first portion of the first content as data which may be cached by the first plurality of remote radio terminals, wherein the second plurality of remote radio terminals are not included in the first plurality of remote radio terminals;

receiving a request from one of the first plurality of remote radio terminals to obtain a first manifest file for a streaming media item;

obtaining the first manifest file, wherein the first manifest file specifies a first plurality of streams for the streaming media item;

selecting a first stream included in the first plurality of streams based on a resolution of the first stream being a first predetermined resolution;

including the selected first stream in a modified manifest file;

selecting a second stream included in the first plurality of streams based on a resolution of the second stream being a second predetermined resolution that is different than the first predetermined resolution;

including the selected second stream in the modified manifest file; and responding to the request to obtain the first manifest file with the modified manifest file, in which the modified manifest file specifies the first stream and the second stream, but not all of the first plurality of streams;

wherein the first content item is identified based on the first content item being included in the selected first stream ; and wherein the first transmission includes information indicating the first content item is associated with a first source which causes the second plurality of remote radio terminals to selectively not cache the first portion of the first content item received via the first transmission due to the second plurality of remote radio terminals not having been used to access content items from the first source.

2. The method of claim 1, further comprising:
receiving a first request for the first content item from a first radio terminal; and
receiving a second request for the first content item from a second radio terminal;
wherein the first content item is identified based on the first request and the second request.

3. The method of claim 1, wherein the identifying the first content item and the causing the first portion of the first content item to be transmitted are performed prior to any of the first plurality of remote radio terminals receiving a request for the first content item.

4. The method of claim 1, wherein the first transmission is transmitted by a communication satellite and each of the first plurality of remote radio terminals includes a satellite communication receiver adapted to receive the first transmission from the communication satellite.

5. The method of claim 1, wherein the first transmission is transmitted by a cellular communications base station and each of the first plurality of remote radio terminals includes a transceiver adapted to receive the first transmission from the base station.

6. The method of claim 1, wherein the first transmission identifies the first portion of the first content as data which may be cached by the second plurality of remote radio terminals.

7. The method of claim 1, further comprising receiving cache usage information from a first remote radio terminal, the cache usage information indicating use of a second content item from a cache storage unit included in the first remote radio terminal, wherein the first content item is identified based on the cache usage information.

8. The method of claim 1, further comprising:
receiving, at a first remote radio terminal included in the first plurality of remote terminals, the first transmission;
in response to the receiving of the first transmission, storing the first portion of the first content item in a cache included in the first remote radio terminal;
receiving, at the first remote radio terminal, a request for the first content item; and
providing the first portion of the first content item from the cache in response to the request.

9. The method of claim 8, further comprising:
identifying, at the first remote radio terminal, one or more missing portions of the first content item not successfully received via multicast transmissions;
receiving, from the first remote radio terminal, information identifying the missing portions; and
causing the missing portions to be transmitted to the first remote radio terminal via one or more multicast radio transmissions.

10. The method of claim 1, further comprising:
obtaining the first manifest file from a content server;
selecting a third stream included in the first plurality of streams based on bitrates and/or resolutions previously requested from the content server; and
including the selected third stream in the modified manifest file.

11. The method of claim 1, wherein:
selecting a third stream included in the first plurality of streams based on the third stream having the highest bitrate of the first plurality of streams; and
including the selected third stream in the modified manifest file.

12. A data communication system comprising a cache server including one or more processors configured to:
identify a first content item as being of potential interest to multiple remote radio terminals;
in response to the identification of the first content item, cause a first portion of the first content item to be transmitted to a first plurality of remote radio terminals and a second plurality of remote radio terminals via a first multicast radio transmission, wherein the first transmission identified the first portion of the first content as data which may be cached by the first plurality of remote radio terminals, wherein the second plurality of remote radio terminals are not included in the first plurality of remote radio terminals;
receive a request from one of the first plurality of remote radio terminals to obtain a first manifest file for a streaming media item;
obtain the first manifest file, wherein the first manifest file specifies a first plurality of streams for the streaming media item;
select a first stream included in the first plurality of streams based on a resolution of the first stream being a first predetermined resolution;
include the selected first stream in a modified manifest file;
select a second stream included in the first plurality of streams based on a resolution of the second stream being a second predetermined resolution that is different than the first predetermined resolution;
include the selected second stream in the modified manifest file; and
respond to the request to obtain the first manifest file with the modified manifest file, in which the modified manifest file specifies the first stream and the second stream, but not all of the first plurality of streams;

wherein the first transmission includes information indicating the first content item is associated with a first source which causes the second plurality of remote radio terminals to selectively not cache the first portion of the first content item received via the first transmission due to the second plurality of remote radio terminals not having been used to access content items from the first source.

13. The data communication system of claim 12, wherein the one or more processors are further configured to:
receive a first request for the first content item from a first radio terminal; and
receive a second request for the first content item from a second radio terminal;
wherein the first content item is identified based on the first request and the second request.

14. The data communication system of claim 12, wherein the identifying the first content item and the causing the first portion of the first content item to be transmitted are performed prior to any of the first plurality of remote radio terminals receiving a request for the first content item.

15. The data communication system of claim 12, wherein the first transmission is transmitted by a communication satellite and each of the first plurality of remote radio terminals includes a satellite communication receiver adapted to receive the first transmission from the communication satellite.

16. The data communication system of claim 12, wherein the first transmission is transmitted by a cellular communications base station and each of the first plurality of remote radio terminals includes a transceiver adapted to receive the first transmission from the base station.

17. The data communication system of claim 12, wherein the first transmission identifies the first portion of the first content as data which may be cached by the second plurality of remote radio terminals.

18. The data communication system of claim 12, further comprising:
a remote radio terminal comprising:
a radio receiver adapted to receive the first transmission,
a cache storage unit, and
one or more processors adapted to:
in response to receiving the first transmission, store the first portion of the first content item in the cache storage unit,
receive a request for the first content item, and
provide the first portion of the first content item from the cache storage unit in response to the request.

19. The data communication system of claim 12, further comprising:
a remote radio terminal comprising:
a radio transceiver adapted to receive the first transmission,
a cache storage unit, and
one or more processors adapted to:
receive a portion of a second content item via a second multicast radio transmission received by the radio transceiver,
in response to receiving the portion of the second content item, store the portion of the second content item in the cache storage unit,
receive a first request for the second content item,
provide the portion of the second content item from the cache storage unit in response to the first request,
transmit via the radio transceiver, based on the first request for the second content item, cache usage information indicating use of the second content item from the cache storage unit,
in response to receiving the first transmission, store the first portion of the first content item in the cache storage unit,
receive a second request for the first content item, and
provide the first portion of the first content item from the cache storage unit in response to the second request,
wherein the one or more processors included in the cache server are further configured to:
receive the cache usage information transmitted by the remote radio terminal, and
identify the first content item based on the cache usage information indicating use of the second content item from the cache storage unit.

20. The data communication system of claim 12, wherein the one or more processors are further configured to identify the first content item based on one of the streams included in the modified manifest file.

* * * * *